(12) United States Patent
Irie et al.

(10) Patent No.: US 6,497,298 B2
(45) Date of Patent: Dec. 24, 2002

(54) VEHICLE TRACTION CONTROL SYSTEM AND METHOD

(75) Inventors: Yoshiaki Irie, Numazu (JP); Masahiko Taniguchi, Chiryu (JP)

(73) Assignees: Toyota Jidosha Kabushiki Kaisha, Toyota (JP); Denso Corporation, Kariya (JP)

(*) Notice: Subject to any disclaimer, the term of this patent is extended or adjusted under 35 U.S.C. 154(b) by 6 days.

(21) Appl. No.: 09/902,271

(22) Filed: Jul. 11, 2001

(65) Prior Publication Data

US 2002/0005307 A1 Jan. 17, 2002

(30) Foreign Application Priority Data

Jul. 17, 2000 (JP) ........................................ 2000-215641

(51) Int. Cl.$^7$ ............................................. F02D 29/07
(52) U.S. Cl. .......................................... 180/197; 701/86
(58) Field of Search ........................... 180/197; 701/82, 701/83, 84, 85, 86, 90

(56) References Cited

U.S. PATENT DOCUMENTS

| | | | | |
|---|---|---|---|---|
| 5,168,952 A | * | 12/1992 | Oono et al. ........... | 123/198 DB |
| 5,418,726 A | * | 5/1995 | Yagi ...................... | 180/197 |
| 6,002,979 A | * | 12/1999 | Ishizu .................... | 180/197 |

FOREIGN PATENT DOCUMENTS

JP    A 8-49579    2/1996

* cited by examiner

*Primary Examiner*—Kevin Hurley
(74) *Attorney, Agent, or Firm*—Oliff & Berridge, PLC

(57) ABSTRACT

Driving slip rates SLi of respective wheels are calculated, and if a driving slip is excessively large is judged based on the driving slip rates SLi. Further, if a vehicle is in a predetermined turning state is judged, and if the vehicle is in an accelerating state from taking off on a road surface where a difference between coefficients of friction of the road surface with respect to the left and right wheels is large is judged. In addition, if the vehicle is in a state in which a powertrain such as a differential should be protected is judged. Fuel supply to an engine is cut until a possibility of worsening of behavior has been eliminated when the driving slip is excessively large and there is a possibility of worsening of behavior due to turning and the like, and the driving slip is reduced by reduction of driving force. Then, execution of the cutting of fuel supply is prohibited for a predetermined time after execution of the cutting of fuel supply.

23 Claims, 3 Drawing Sheets

VEHICLE TRACTION CONTROL SYSTEM AND METHOD

INCORPORATION BY REFERNCE

The disclosure of Japanese Patent Application No. 2000-215641 filed on Jul. 17, 2000 including the specification, drawings and abstract is incorporated herein by reference in its entirety.

BACKGROUND OF THE INVENTION

1. Field of the Invention

The invention relates to a vehicle traction control system and more specifically to a traction control system and a method for suppressing a driving slip of a driving wheel by cutting supply of fuel to an engine.

2. Description of Related Art

As one of traction control systems for suppressing a driving slip of a driving wheel in a vehicle such as an automobile, there is a known traction control system for cutting supply of fuel to an engine when the driving slip of the driving wheel becomes excessively large to reduce output torque of the engine and for prohibiting cutting of fuel supply for a predetermined time after execution of the cutting of fuel supply as described in Japanese Patent Laid-open No. HEI8-49579, for example.

According to the aforementioned traction control system, because the driving torque of the driving wheel is reduced by cutting the fuel supply to the engine when the driving slip of the driving wheel becomes excessively large, it is possible to effectively suppress the driving slip of the driving wheel. In addition, cutting of fuel supply is prohibited for the predetermined time, after execution of cutting of fuel supply. Therefore, it is possible to effectively prevent repeated execution of cutting of fuel supply and occurrence of a problem such as an excessive rise in temperature of a catalyst due to combustion of unburned components of fuel in an exhaust gas purifying catalytic converter.

However, in the aforementioned traction control system, cutting of fuel supply is prohibited for the predetermined time after execution of cutting of fuel supply. Therefore, even if the driving slip of the driving wheel becomes excessively large and behavior of the vehicle becomes unstable in a condition in which the vehicle is turning after the driving slip of the driving wheel becomes excessively large in straight traveling of the vehicle and cutting of fuel supply is executed, for example, cutting of fuel supply is not carried out until the predetermined time passes. Therefore, it is difficult to suppress the driving slip of the driving wheel and in some cases it is not possible to effectively stabilize the behavior of the vehicle at an early stage.

SUMMARY OF THE INVENTION

It is an object of the invention to reliably prevent worsening of behavior of a vehicle by cutting of fuel supply while preventing occurrence of a problem such as an excessive rise in temperature of an exhaust gas purifying catalyst by taking into consideration a possibility that behavior of the vehicle becomes unstable in addition to the aforementioned condition for starting traction control.

A first aspect of the invention is a vehicle traction control system comprising: a driving slip judging unit that judges a degree of driving slip of a driving wheel; a behavior judging unit that judges if there is a possibility that behavior of a vehicle becomes unstable; an executing unit that executes cutting of fuel supply to an engine so as to control the driving slip of the driving wheel when the degree of the driving slip judged by the driving slip judging unit is equal to or greater than a reference value and it is judged by behavior judging unit that there is the possibility that behavior of the vehicle becomes unstable; and a prohibiting unit that prohibits cutting of fuel supply to the engine for a predetermined time after execution of the cutting of fuel supply.

A second aspect of the invention is a method for controlling vehicle traction including: a slip judging step for judging if a degree of driving slip of a driving wheel is equal to or greater than a reference value; a first behavior judging step for judging if there is a possibility that behavior of a vehicle becomes unstable; an executing step for executing cutting of fuel supply to an engine when the degree of the driving slip is judged at the slip judging step to be equal to or greater than the reference value and it is judged at the first behavior judging step that there is the possibility that behavior of the vehicle becomes unstable; and a prohibiting step for prohibiting cutting of fuel supply to the engine for a predetermined time after execution of the cutting of fuel supply.

According to the above system or method, cutting of fuel supply to the engine is executed when it is judged that the degree of the driving slip of the driving wheel is equal to or greater than the reference value and that there is a possibility that behavior of the vehicle becomes unstable. Therefore, the cutting of fuel supply is not executed only because the driving slip of the driving wheel has become large. Therefore, the cutting of fuel supply is reliably executed when the possibility that behavior of the vehicle becomes unstable is then generated in a state in which the driving slip of the driving wheel is large, thereby worsening of behavior of the vehicle is reliably prevented.

DETAILED DESCRIPTION OF THE PREFERRED EMBODIMENT

A preferred embodiment of the invention will be described below in detail by referring to the accompanying drawings.

Figure 1:
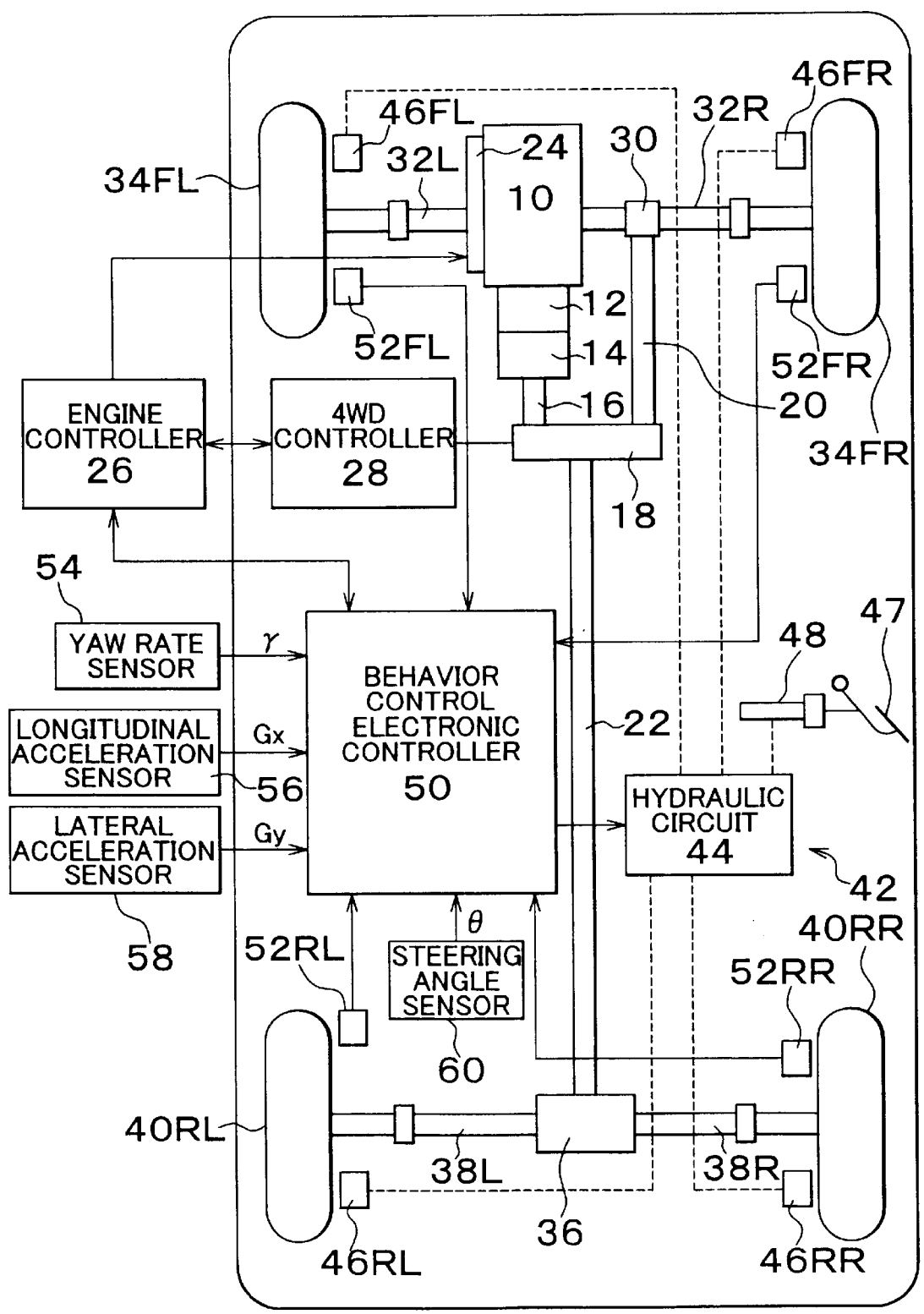
FIG. 1 is a schematic block diagram showing a traction control system of an embodiment of the invention.

FIG. 1 is a schematic block diagram showing an example in which a traction control system, which is an embodiment of the invention, is applied to a four-wheel drive vehicle having a behavior controller of a braking force control type.

In FIG. 1, a driving force of an engine 10 is transmitted to an output shaft 16 through a torque converter 12 and a transmission 14. A driving force of the output shaft 16 is transmitted by a center differential 18 to a front wheel propeller shaft 20 and a rear wheel propeller shaft 22. Each cylinder of the engine 10 has a fuel injector 24. An amount of intake air and an amount of fuel injected by the fuel injector 24 are controlled by an engine controller 26 according to a depressed amount of an accelerator pedal (not shown in FIG. 1) and the like, the accelerator pedal being operated by a driver. As a result, output of the engine 10 is controlled.

Although it is not shown in FIG. 1, fuel injected by the fuel injector 24 into each cylinder of the engine 10 is mixed with the intake air in each cylinder. Exhaust gas generated by combustion of an air-fuel mixture flows through an exhaust pipe into an exhaust gas purifying catalytic converter. After harmful components from the exhaust gas are removed by a catalyst in the converter, the exhaust gas is discharged through a muffler into the atmosphere.

In the embodiment shown in the drawings, the center differential 18 includes an actuator for controlling distribution of the driving force between the front and rear wheels. The actuator is controlled by a 4WD controller 28 based on a command signal from the engine controller 26. As a result, a distribution ratio of the driving force between the front and rear wheels is controlled so as to be an optimum ratio according to a traveling state of the vehicle.

A driving force of the front wheel propeller shaft 20 is transmitted by a front wheel differential 30 to a left front wheel axle 32L and a right front wheel axle 32R. Thus, left and right front wheels 34FL and 34FR are driven for rotation. A driving force of the rear wheel propeller shaft 22 is similarly transmitted by a rear wheel differential 36 to a left rear wheel axle 38L and a right rear wheel axle 38R. Thus, left and right rear wheels 40RL and 40RR are driven for rotation.

Braking forces of left and right front wheels 34FL and 34FR and the left and right rear wheels 40RL and 40RR are controlled by controlling braking pressures of corresponding wheel cylinders 46FL, 46FR, 46RL, and 46RR by an oil hydraulic circuit 44 of a brake 42. Although it is not shown in the drawings, the oil hydraulic circuit 44 includes a reservoir, an oil pump, various valve units, and the like. The braking pressure of each wheel cylinder is normally controlled by a master cylinder 48 driven according to a depressing operation of a brake pedal 47 by the driver. The braking pressure is controlled if necessary by a behavior-control electronic controller 50 which will be described later in detail.

In the behavior-control electronic controller 50, signals indicating wheel speeds Vwfr, Vwfl, Vwrr, and Vwrl of the left and right front wheels and the left and right rear wheels from wheel speed sensors 52FR, 52FL, 52RR, and 52RL, a signal indicating a yaw rate γ of the vehicle from a yaw rate sensor 54, a signal indicating a longitudinal acceleration Gx and a signal indicating a lateral acceleration Gy respectively from a longitudinal acceleration sensor 56 and a lateral acceleration sensor 58, and a signal indicating a steering angle θ from a steering angle sensor 60 are input.

The yaw rate sensor 54, the lateral acceleration sensor 58, and a steering angle sensor 60 detect the lateral acceleration and the like as positive quantities in a leftward turning direction of the vehicle. In the case of a rightward turning direction, on the other hand, the lateral acceleration and the like are detected as negative quantities. The longitudinal acceleration sensor 56 detects the longitudinal acceleration of the vehicle in an accelerating direction as a positive quantity. In the case of a decelerating direction, on the other hand, the longitudinal acceleration is detected as a negative quantity. Each of the engine controller 26, the 4WD controller 28, and the behavior-control electronic controller 50 may be actually composed of one microcomputer including a CPU, ROM, RAM, and an input/output unit and a driving circuit. In other words, it is possible that one controller (e.g., ECU) performs three functions as the engine controller 26, the 4WD controller 28, and the behavior-control electronic controller 50.

Figure 2:
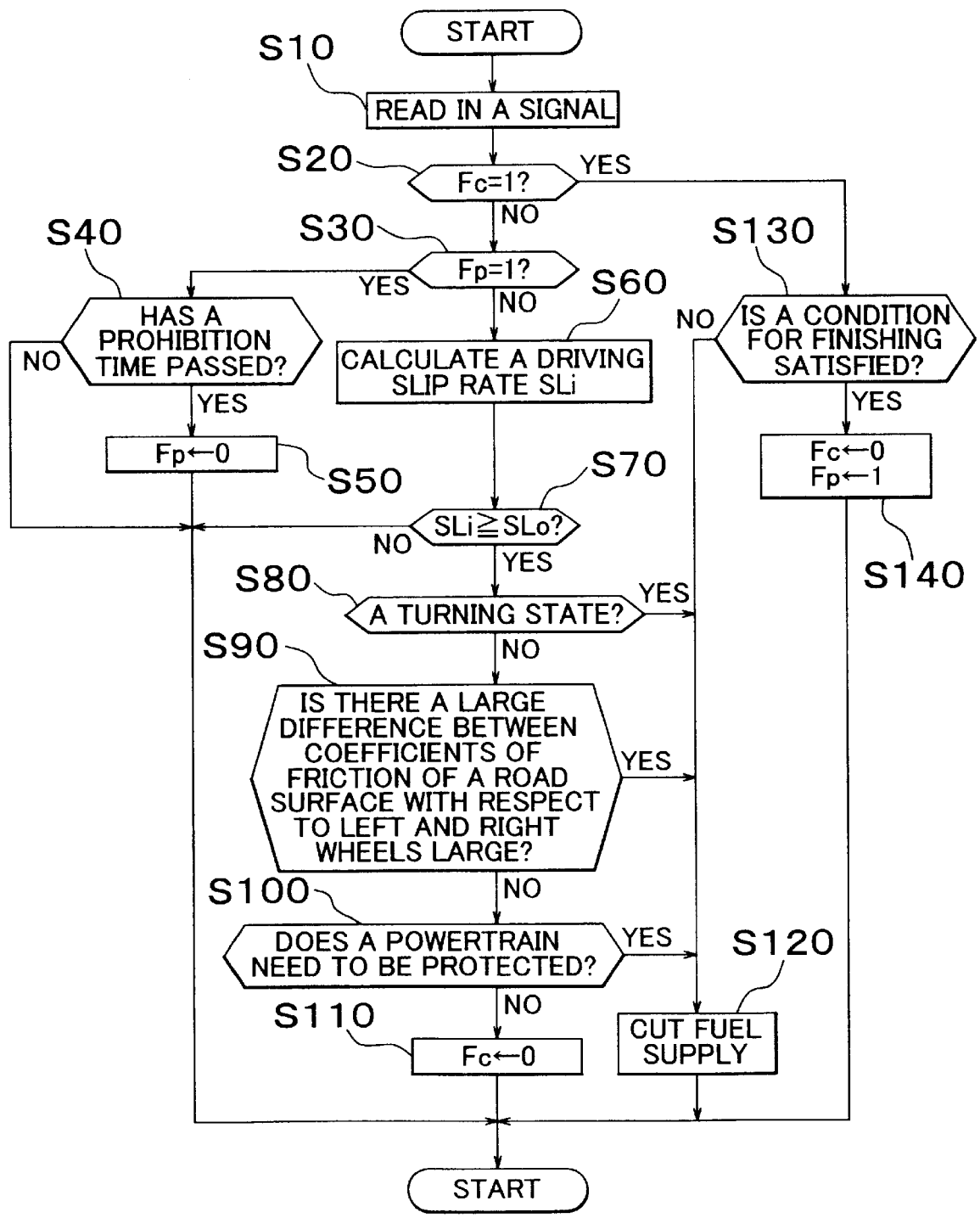
FIG. 2 is a flow chart showing a traction control routine of the embodiment.

As described later in detail, the behavior-control electronic controller 50 judges if a driving slip of the wheel is excessively large and if there is a possibility that behavior of the vehicle becomes unstable according to a routine shown in FIG. 2 based on parameters detected by the aforementioned various sensors. When the driving slip of the wheel is excessively large and there is the possibility that behavior of the vehicle becomes unstable, the behavior-control electronic controller 50 outputs a command signal for cutting fuel injected and supplied by the fuel injector 24 to at least a part of the cylinders to the engine controller 26. The engine controller 26 reduces output of the engine 10, thereby reducing the driving force in response to the command signal. Thus, the driving slip of the wheel is reduced and worsening of behavior of the vehicle can be prevented.

If cutting of fuel supply is executed by the engine controller 26, the behavior-control electronic controller 50 prohibits execution of cutting of fuel supply for a predetermined time Tin (e.g., about a few seconds to several tens of seconds) from an instant when the cutting of fuel supply is finished. Thus, it is possible to prevent occurrence of a problem such as an excessive rise in temperature of the catalyst due to combustion of unburned components in the catalytic converter, the components having flowed into the catalytic converter during cutting of fuel supply.

Furthermore, the behavior-control electronic controller 50 judges turning behavior of the vehicle based on the parameters detected by the aforementioned various sensors and calculates a target slip rate of the wheel (controlled wheel) to which the braking force is applied to stabilize the turning behavior by taking a wheel speed of a turning inside front wheel as a reference wheel speed when the vehicle is in a spinning state or a drifting-out state. The behavior-control electronic controller 50 controls the braking force of the controlled wheel such that a slip rate of the controlled wheel becomes equal to the target slip rate. Thus, yawing moment in a direction for suppressing spinning or a direction for suppressing drifting out is applied to the vehicle, the vehicle is decelerated, and behavior is stabilized. The control of behavior by controlling the braking force does not constitute the gist of the invention. Therefore, a detailed description of this behavior control will be omitted. This behavior control may be carried out in an arbitrary manner known in this technical field or may be omitted.

Next, the traction control routine in the embodiment will be described by referring to a flow chart shown in FIG. 2. Control according to the flow chart shown in FIG. 2 is started by closing an ignition switch (not shown) and is executed repeatedly at predetermined time periods. A flag Fc is a flag indicating if cutting of fuel supply is being executed and a flag Fp is a flag indicating if cutting of fuel supply is being prohibited.

At step 10, read in of a signal and the like indicating the yaw rate γ of the vehicle detected by the yaw rate sensor 54 is carried out. At step 20, if the flag Fc is 1 or not, in other words, if cutting of fuel supply is being executed or not is judged. The routine goes to step 130 when an affirmative judgement is made at step 20 and goes to step 30 when a negative judgement is made at step 20.

At step 30, if the flag Fp is 1 or not, in other words, if cutting of fuel supply is prohibited or not is judged. The routing goes to step 60 when a negative judgement is made at step 30 and goes to step 40 if an affirmative judgement is made.

At step 40, whether the time Tin for which cutting of fuel supply is prohibited has passed since the last cutting of fuel supply is judged to finish. If a negative judgement is made, the routine returns to step 10. If an affirmative judgement is made, the routine returns to step 10 after the flag Fp is reset to 0 at step 50.

At step 60, a vehicle speed Vb is calculated in a manner known in this technical field based on wheel speeds Vwi of the respective wheels and driving slip rates SLi (i=fr, fl, rr, rl) of the respective wheels are calculated based on the wheel speeds Vwi of the respective wheels and the vehicle speed Vb.

At step 70, if the driving slip rate SLi of at least one wheel is equal to or greater than a reference value $SL_0$ (a positive constant), in other words, if the driving slip is excessively large is judged. The routine returns to step 10 if a negative judgement is made and goes to step 80 if an affirmative judgement is made.

At step 80, if the vehicle is in a predetermined turning state in which there is the possibility of worsening of behavior is judged. The routine goes to step 120 when an affirmative judgement is made and goes to step 90 when a negative judgement is made.

In this case, if the vehicle is in the predetermined turning state or not is judged as follows. A target yaw rate γc is calculated according to the following expression 1 where Kh is a stability factor, H is a wheel base, and Rg is a steering gear ratio, for example. A reference yaw rate γt is calculated according to the following expression 2 where T is a time constant and s is Laplace operator. A target lateral acceleration Gyt is calculated as the product of the reference yaw rate γt and the vehicle speed Vb. If the vehicle is in the predetermined turning state is judged according to if all conditions of the following expressions 3 to 5 are satisfied when $\theta_0$, $Gy_0$, and $\gamma_0$ are respectively 90 deg, ¼ g (gravitational acceleration), and a positive constant of about 10 deg/s.

$$\gamma c = Vb \cdot \theta / (1 + Kh \cdot Vb^2) \cdot H/Rg \qquad (1)$$

$$\gamma t = \gamma c / (1 + T \cdot s) \qquad (2)$$

$$|\theta| \geq \theta_0 \qquad (3)$$

$$|Gyt - Gy| \geq Gy_0 \qquad (4)$$

$$|\gamma| \geq \gamma_0 \qquad (5)$$

At step 90, if the vehicle is in an accelerating state from taking off on a road surface where a difference between coefficients of friction of the road surface with respect to the left and right wheels is large is judged. The routine goes to step 120 when an affirmative judgement is made and goes to step 100 when a negative judgement is made.

In this case, if the vehicle is in the accelerating state from taking off on the road surface where the difference between coefficients of friction of the road surface with respect to the left and right wheels is large is judged according to if all conditions of the following expressions 6 to 8 are satisfied when $V_0$ is a positive constant of about ten and several km/h (more specifically, about 20 to 40 km/h) and $Vw_0$ is a positive constant of about a decades of km/h, for example. In other words, if the vehicle speed Vb is equal to or smaller than $V_0$, if an absolute value of a difference between speeds of the left and right front wheels is equal to or greater than $Vw_0$, and if an absolute value of a difference between speeds of the left and right rear wheels is equal to or greater than $Vw_0$ are judged.

$$Vb \leq = V_0 \qquad (6)$$

$$|Vwfl - Vwfr| \geq Vw_0 \qquad (7)$$

$$|Vwrl - Vwrr| \geq Vw_0 \qquad (8)$$

At step 100, if the vehicle is in a state in which a powertrain such as respective differentials should be protected is judged. The routine returns to step 10 after the flag Fc is reset to 0 at step 110 when a negative judgement is made. When an affirmative judgement is made, the routine returns to step 10 after a command signal indicating that fuel supply by the fuel injector 24 to at least a part of the cylinders should be cut is output to the engine controller 26 and the flag Fc is set at 1 at step 120.

In this case, if the vehicle is in the state in which the powertrain should be protected is judged according to if any of conditions of the following expressions 9 to 11 is satisfied, where Vwf and Vwr are respectively an average wheel speed of the left and right front wheels and an average wheel speed of the left and right rear wheels, V1 is a positive constant of about a decades of km/h (more specifically, about 20 to 40 km/h), and V2 and V3 are respectively positive constants of about 100 km/h.

$$|Vwf - Vwr| \geq V1 \qquad (9)$$

$$|Vwfl - Vwfr| \geq V2 \qquad (10)$$

$$|Vwfl - Vwrr| \geq V3 \qquad (11)$$

The number of cylinders to which fuel supply is cut by the engine controller 26 based on the command signal output at step 120 may be constant. It is also possible to variably set the number of cylinders to which fuel supply is cut according to the driving slip rates SLi such that the number of cylinders to which fuel supply is cut is increased as the number of wheels whose driving slip rates SLi are equal to or greater than the reference value $SL_0$ increases and that the number of cylinders to which fuel supply is cut is increased as the driving slip rates SLi increase over the reference value.

At step 130, if conditions for finishing cutting of fuel supply are satisfied is judged. The routine goes to step 120 when a negative judgement is made. When an affirmative judgement is made, the routine returns to step 10 after the flag Fc is reset to 0 and the flag Fp is set at 1 at step 140.

In this case, if the conditions for finishing cutting of fuel supply are satisfied is judged according to if any of the conditions of the above expressions 3 to 5 is not satisfied when cutting of fuel supply is started by the affirmative judgement made at step 80, for example. When cutting of fuel supply is started by the affirmative judgement made at step 90, if the conditions for finishing cutting of fuel supply are satisfied is judged according to if any of the conditions of the above expressions 6 to 8 is not satisfied. When cutting of fuel supply is started by the affirmative judgement made at step 100, if the conditions for finishing cutting of fuel supply are satisfied may be judged according to if none of the conditions of the above expressions 9 to 11 are satisfied.

In the judgement of the aforementioned finishing conditions, the respective reference values of the expressions 3 to 11 may be set at values smaller than the corresponding reference values. It is also possible to finish cutting of fuel supply when the driving slip rates SLi of all the wheels are smaller than finishing reference values in addition to or separately from the judgement of the aforementioned finishing conditions.

Thus, according to the embodiment shown in the drawings, the negative judgement is made at each of steps 20, 30, and 70 when an excessively large driving slip is not generated in any of the wheels and behavior of the vehicle is stable. Therefore, cutting of fuel supply to the engine 10 is not carried out in this case.

When the excessively large driving slip is generated in any of the wheels while there is no possibility that behavior of the vehicle becomes unstable, the negative judgement is made at each of steps 20 and 30 and the affirmative judgement is made at step 70 but the negative judgement is made at each of steps 80 to 100. Therefore, cutting of fuel supply to the engine is not carried out in this case either.

When the driving slip of any of the wheels is excessively large and there is the possibility that behavior of the vehicle becomes unstable, the negative judgement is made at each of steps 20 and 30, the affirmative judgement is made at step 70, and the affirmative judgement is made at any of steps 80 to 100. Therefore, cutting of fuel supply to the engine is carried out at step 120 in this case and output of the engine is reduced, resulting in reducing the driving slip of the wheel and behavior of the vehicle becomes stabilized before behavior of the vehicle becomes unstable.

If cutting of fuel supply to the engine is started in the above manner, the affirmative judgement is made at step 20 because the flag Fc is 1. Until it is judged that conditions for finishing cutting of fuel supply are satisfied at step 130, i.e., until the driving slip of the wheel is reduced and behavior of the vehicle becomes stable, cutting of fuel supply is continued.

If cutting of fuel supply to the engine is finished, the flag Fc is reset to 0 while the flag Fp is set at 1. Therefore, the negative judgement is made at step 20, the affirmative judgement is made at step 30, and the flag Fp has been maintained at 1 until it is judged that the predetermined prohibition time Tin has passed since the cutting of fuel supply finished at step 20. As a result, cutting of fuel supply to the engine is prohibited.

Figure 3:
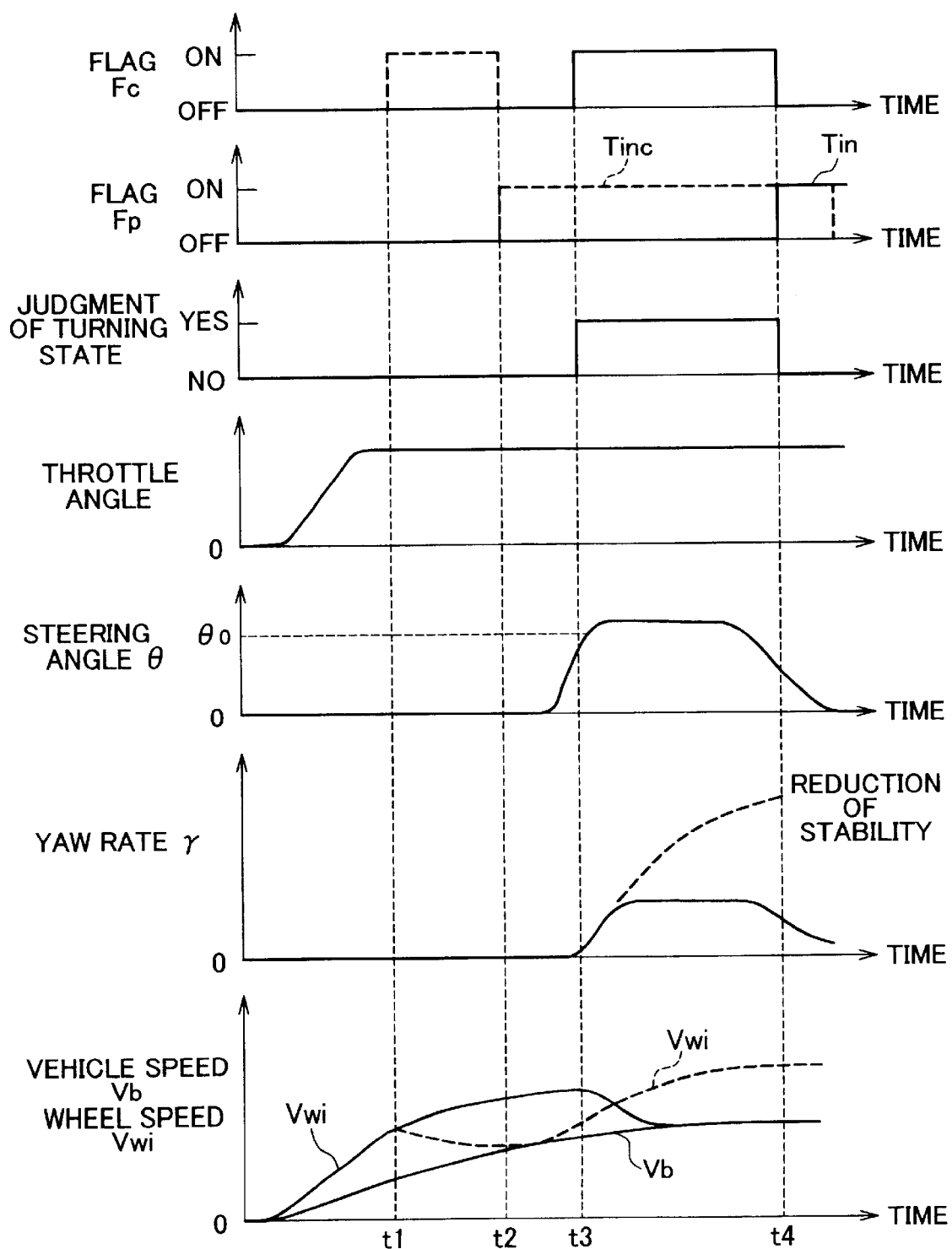
FIG. 3 is a graph showing actuations of the embodiment of the invention and a traction control system of a comparative example when a vehicle turns after traveling straight in contrast with each other.

For example, FIG. 3 is a graph showing actuations of the above embodiment of the invention and a traction control system of a comparative example in contrast with each other when the vehicle is turning after traveling straight after take-off. A thick broken line shows a case of the traction control system of the comparative example and a thick solid line shows a case of the above embodiment which is an embodiment of the invention.

As shown in FIG. 3, the vehicle speed Vb gradually increases as the vehicle takes off and a wheel speed Vwi of a certain driving wheel increases with higher acceleration than the vehicle speed Vb. As a result, it is assumed that the driving slip rate SLi of the wheel becomes equal to or greater than the reference value $SL_0$ at a time point t1, for example.

In the case of the traction control system of the comparative example, cutting of fuel supply to the engine is started (i.e., the flag Fc is turned on. That is the flag Fc is set at 1.) at the time point t1 and continued to a time point t2 when the driving slip rate of the driving wheel becomes equal to or smaller than a predetermined value. As a result, the driving slip is reduced. As shown with a broken line with regard to the flag Fp for the sake of convenience, cutting of fuel supply to the engine is prohibited until the predetermined prohibition time Tinc passes from the time point t2. Therefore, if the vehicle is brought into the turning state after the time point t2 to cause the possibility that behavior of the vehicle becomes unstable, cutting of fuel supply to the engine is not carried out and the driving force of the wheel is not reduced. Therefore, the yaw rate γ becomes large and stability of the vehicle is reduced in some cases, for example.

On the other hand, according to the above embodiment, cutting of fuel supply is not started at the time point t1. Therefore, it is possible to execute cutting of fuel supply from the time point t1 to the time point t2, not to mention after the time point t2. As shown in FIG. 3, if a steering angle θ becomes equal to or greater than a reference value $θ_0$ and other turning judgement conditions are satisfied at a time point t3, cutting of fuel supply is started at the time point t3 and the driving force of the wheel is reduced, resulting in reducing the driving slip of the wheel. As a result, it is possible to reliably prevent the state in which the yaw rate γ increases and stability of the vehicle is reduced, which is what happens with the traction control system of the comparative example.

If the steering angle θ becomes smaller than the reference value of finishing judgement and the possibility of worsening of behavior of the vehicle has been eliminated at a time point t4, cutting of fuel supply is finished at the time point t4. Then, cutting of fuel supply to the engine is prohibited for the predetermined time Tin from the time point t4.

In FIG. 3, the case in which the turning judgement of the vehicle is carried out when the driving slip of any of the wheels is excessively large is shown. However, the traction control system of the embodiment is similarly actuated in a case in which the vehicle is judged to be in the accelerating state from taking off on a road surface with a large difference between coefficients of friction of the road surface with respect to the left and right wheels when the driving slip of any of the wheels is excessively large and in a case in which it is judged that the powertrain should be protected when the driving slip of any of the wheels is excessively large.

Especially, according to the above embodiment, cutting of fuel supply is finished when the possibility of worsening of behavior of the vehicle has been eliminated. Therefore, it is possible to execute just enough cutting of fuel supply as compared with the case in which cutting of fuel supply is executed for a certain time when conditions for starting cutting of fuel supply are satisfied, for example. Therefore, it is possible to effectively diminish the possibility that behavior of the vehicle cannot be effectively stabilized due to insufficient time for cutting the fuel supply and that a temperature of the exhaust gas purifying catalyst rises excessively due to excessively long time for cutting the fuel supply.

According to the above embodiment, cutting of fuel supply is not carried out even if the driving slip of the driving wheel becomes large if the difference between coefficients of friction of the road surface with respect to the left and right wheels is smaller than a reference value. On the other hand, if there is the possibility that behavior of the vehicle becomes unstable when the driving slip of the wheel is excessively large is judged based not only on if the vehicle is in the predetermined turning state, but also on if the vehicle is in the accelerating state from taking off on the road surface where the difference between the coefficients of friction of the road surface with respect to the left and right wheels is large, and on if the power train should be protected. Therefore, it is possible to effectively diminish the possibility of worsening of behavior of the vehicle as compared with a case without these judgments.

According to the above embodiment, cutting of fuel supply is not carried out even if the driving slip rate becomes large if the vehicle is in a stable state such as straight traveling. On the other hand, if turning behavior of the vehicle is actually brought into an unstable state such as a spinning state or a drifting-out state, behavior control by applying the braking force to the predetermined controlled wheel is executed. Therefore, even if it is impossible to suppress worsening of behavior of the vehicle by cutting of fuel supply to the engine, it is possible to reliably prevent serious worsening of behavior of the vehicle.

Although the invention has been specifically described above by way of the specific embodiment, the invention is not limited to the aforementioned embodiment and it will be clear to those skilled in the art that other various embodiments are possible within the scope of the invention.

For example, although if there is the possibility that behavior of the vehicle becomes unstable is judged, in the above embodiment, according to if the vehicle is in the predetermined turning state, if the vehicle is in the accelerating state from taking off on the road surface where the difference between coefficients of friction of the road surface with respect to the left and right wheels is large, and if there is the state in which protection of the powertrain is necessary, any of these judgments may be omitted, and other judgments may be added to these judgments. Further, other judgments may be employed instead of these judgments.

Although the predetermined time Tin for which cutting of fuel supply to the engine is prohibited is constant in the above embodiment, it is also possible to variably set this time according to time for cutting the fuel supply, the number of cylinders to which the fuel supply is cut, and the like. In this case, the longer the time for cutting the fuel supply, the longer the time Tin is. The more the cylinders to which the fuel supply is cut, the longer the time Tin is.

Although if an absolute value of a difference between the target lateral acceleration Gyt and an actual lateral acceleration Gy of the vehicle is equal to or greater than the reference value $Gy_0$ is judged in the above expression 4 as judgement of the turning state of the vehicle at step 80 in the above embodiment, it is also possible that the above judgement may be replaced by judgement of if an absolute value of a difference between the target yaw rate γt and an actual yaw rate γ of the vehicle is equal to or greater than a reference value.

For judgement of if the absolute value of the difference between the target lateral acceleration Gyt and the actual lateral acceleration Gy of the vehicle is equal to or greater than the reference value $Gy_0$, it is possible to use expressions, $Gyt-Gy \leq -Gy_0$ and $Gy_0 \geq Gyt-Gy$ instead of the above expression 4, which can be also applied to the expressions 3, 5, and 7 to 11.

Furthermore, although the vehicle is the four-wheel drive vehicle in the above embodiment, the traction control system of the invention may be applied to a front-wheel drive vehicle and a rear-wheel drive vehicle. In this case, judgement at step 100 in the above embodiment is omitted.

In the case that the traction control system of the invention is applied to a front-wheel drive vehicle or a four-wheel drive vehicle, it may be judged that there is the possibility that behavior of the vehicle becomes unstable when an absolute value of the difference between the wheel speeds of the left and right front wheels is equal to or greater than a reference value. In the case that the traction control system of the invention is applied to a rear-wheel drive vehicle or a four-wheel drive vehicle, it may be judged that there is the possibility that behavior of the vehicle becomes unstable when an absolute value of the difference between the wheel speeds of the left and right rear wheels is equal to or greater than a reference value.

The behavior-control electronic controller 50 in the above embodiment performs functions as a driving slip judging unit and a behavior judging unit of the invention. The engine controller 26 in the above embodiment performs functions as an executing unit and a prohibiting unit of the invention.

It is possible to compose the driving slip judging unit and behavior judging unit of the invention as one unit and the executing unit and the prohibiting unit of the invention as one unit like in the above embodiment. It is also possible to compose the driving slip judging unit, behavior judging unit, the executing unit, and the prohibiting unit as one unit. Furthermore, it is also possible to compose the unit by combining any of the driving slip judging unit, behavior judging unit, the executing unit, and the prohibiting unit and to compose the driving slip judging unit, behavior judging unit, the executing unit, and the prohibiting unit as independent four units.

The behavior-control electronic controller 50 of the above embodiment performs functions as driving slip judging means and behavior judging means of the invention. The engine controller 26 in the above embodiment performs functions as executing means and prohibiting means of the invention. Similarly to the above description of the driving slip judging unit, behavior judging unit, the executing unit, and the prohibiting unit, it is possible to compose the driving slip judging means, behavior judging means, the executing means, and the prohibiting means as one structure, to respectively and independently form the above four means, or to form the above four means by combining any of the four means.

A steering angle recognizing apparatus of the invention may be a device such as the steering angle sensor 60 for directly detecting the steering angle or it is also possible to indirectly detect and recognize the steering angle from a state of the vehicle.

A vehicle velocity recognizing apparatus of the invention may be a apparatus including the wheel speed sensors and a unit (e.g., ECU) for calculating the vehicle velocity from the wheel speeds.

An actual lateral acceleration recognizing apparatus of the invention may be a device such as the lateral acceleration sensor 58 for directly detecting the lateral acceleration of the vehicle or may be a apparatus that indirectly recognizes the acceleration from a state of the vehicle.

An actual yaw rate recognizing apparatus of the invention may be a device such as the yaw rate sensor 54 for directly detecting the yaw rate or may be a apparatus that indirectly recognizes the yaw rate from a state of the vehicle.

An actual acceleration recognizing apparatus of the invention may be the device such as the longitudinal acceleration sensor 56 for directly detecting the longitudinal acceleration of the vehicle or may be a apparatus that indirectly recognizes the acceleration from a state of the vehicle.

A left driving wheel speed recognizing apparatus of the invention may be devices such as the wheel speed sensor 52FL and the wheel speed sensor 52RL for directly detecting the wheel speeds or may be a apparatus that indirectly recognizes the wheel speeds from a state of the vehicle.

A right driving wheel speed recognizing apparatus of the invention may be devices such as the wheel speed sensor 52FR and the wheel speed sensor 52RR for directly detecting the wheel speeds or may be a apparatus that indirectly recognizes the wheel speeds from a state of the vehicle.

A front wheel speed difference recognizing apparatus of the invention may be a apparatus including the wheel speed sensor 52FR, the wheel speed sensor 52FL, and a unit (e.g., ECU) for calculating a difference between the wheel speeds detected by the respective sensors, for example.

A rear wheel speed difference recognizing apparatus of the invention may be a apparatus including the wheel speed sensor 52RR, the wheel speed sensor 52RL, and a unit (e.g., ECU) for calculating a difference between the wheel speeds detected by the respective sensors, for example.

An average wheel speed difference recognizing apparatus of the invention may be a apparatus including the wheel speed sensor 52FR, the wheel speed sensor 52FL, the wheel speed sensor 52RR, and the wheel speed sensor 52RL and further including a unit (e.g., ECU) for obtaining an average value of the speeds detected by the wheel speed sensor 52FR and the wheel speed sensor 52FL, for obtaining an average value of the speeds detected by the wheel speed sensor 52RR and the wheel speed sensor 52RL, and for calculating a difference between the respective average values.

What is claimed is:

1. A vehicle traction control system comprising:
a driving slip judging unit that judges a degree of driving slip of a driving wheel;
a behavior judging unit that judges if there is a possibility that behavior of a vehicle becomes unstable or not;
an executing unit that executes cutting of fuel supply to an engine so as to control the driving slip of the driving wheel when the degree of the driving slip judged by the driving slip judging unit is equal to or greater than a reference value and it is judged by the behavior judging unit that there is the possibility that behavior of the vehicle becomes unstable; and
a prohibiting unit that prohibits cutting of fuel supply to the engine for a predetermined time after execution of the cutting of fuel supply.

2. A vehicle traction control system according to claim 1, wherein the behavior judging unit judges if there is the possibility that behavior of the vehicle becomes unstable based on at least a condition other than the driving slip.

3. A vehicle traction control system according to claim 1, wherein the behavior judging unit judges that there is the possibility that behavior of the vehicle becomes unstable when the vehicle is in a turning state.

4. A vehicle traction control system according to claim 3, wherein the behavior judging unit includes:
a steering angle recognizing apparatus;
a vehicle velocity recognizing apparatus;
an actual lateral acceleration recognizing apparatus; and
an actual yaw rate recognizing apparatus,
the behavior judging unit judges that the vehicle is in the turning state and that there is the possibility that behavior of the vehicle becomes unstable when 1) a steering angle recognized by the steering angle recognizing apparatus is equal to or greater than a reference value, an absolute value of a difference between a target lateral acceleration of the vehicle and an actual lateral acceleration of the vehicle recognized by the actual lateral acceleration recognizing apparatus is equal to or greater than a reference value, and an absolute value of the actual yaw rate of the vehicle recognized by the actual yaw rate recognizing apparatus is equal to or greater than a reference value, the target lateral acceleration being calculated based on a vehicle velocity recognized by the vehicle velocity recognizing apparatus and the steering angle.

5. A vehicle traction control system according to claim 3, wherein the behavior judging unit includes:
a steering angle recognizing apparatus;
a vehicle velocity recognizing apparatus; and
an actual yaw rate recognizing apparatus,
the behavior judging unit judges that the vehicle is in the turning state and that there is the possibility that behavior of the vehicle becomes unstable when a steering angle recognized by the steering angle recognizing apparatus is equal to or greater than a reference value, an absolute value of a difference between a target yaw rate of the vehicle and an actual yaw rate of the vehicle recognized by the actual yaw rate recognizing apparatus is equal to or greater than a reference value, and an absolute value of the actual yaw rate of the vehicle is equal to or greater than a reference value, the target yaw rate being calculated based on a vehicle velocity recognized by the vehicle velocity recognizing apparatus and the steering angle.

6. A vehicle traction control system according to claim 1, wherein the behavior judging unit judges that there is the possibility that behavior of the vehicle becomes unstable when a difference between coefficients of friction of a road surface with respect to left and right wheels is equal to or greater than a reference value.

7. A vehicle traction control system according to claim 6, wherein the behavior judging unit includes:
a vehicle velocity recognizing apparatus;
a left driving wheel speed recognizing apparatus that recognizes a wheel speed of a vehicle left driving wheel; and
a right driving wheel speed recognizing apparatus that recognizes a wheel speed of a vehicle right driving wheel,
the behavior judging unit judges that the difference between the coefficients of friction of the road surface with respect to the left and right wheels is equal to or greater than the reference value and that there is the possibility that behavior of the vehicle becomes unstable when a vehicle velocity recognized by the vehicle velocity recognizing apparatus is equal to or smaller than a reference value and an absolute value of a difference between the wheel speed of the vehicle left driving wheel recognized by the left driving wheel speed recognizing apparatus and the wheel speed of the vehicle right driving wheel recognized by the right driving wheel speed recognizing apparatus is equal to or greater than a reference value.

8. A vehicle traction control system according to claim 7, wherein the vehicle is a four-wheel drive vehicle,
the behavior judging unit includes:
the vehicle velocity recognizing apparatus;
a front wheel speed difference recognizing apparatus that recognizes a difference between a wheel speed of a vehicle left front driving wheel and a wheel speed of a vehicle right front driving wheel; and
a rear wheel speed difference recognizing apparatus that recognizes a difference between a wheel speed of a vehicle left rear driving wheel and a wheel speed of a vehicle right rear driving wheel,
the behavior judging unit judges that the difference between the coefficients of friction of the road surface with respect to the left and right wheels is equal to or greater than the reference value and that there is the possibility that behavior of the vehicle becomes unstable when the vehicle velocity recognized by the vehicle velocity recognizing apparatus is equal to or smaller than the reference value, an absolute value of a difference between the wheel speeds of the left and right front wheels recognized by the front wheel speed difference recognizing apparatus is equal to or greater than a reference value, and an absolute value of a difference between the wheel speeds of the left and right rear wheels recognized by the rear wheel speed difference recognizing apparatus is equal to or greater than a reference value.

9. A vehicle traction control system according to claim 1, wherein the vehicle is one of the four-wheel drive vehicle and front-wheel drive vehicle,
the behavior judging unit includes a front wheel speed difference recognizing apparatus that recognizes a difference between a wheel speed of a vehicle left front driving wheel and a wheel speed of a vehicle right front driving wheel, and
the behavior judging unit judges that there is the possibility that behavior of the vehicle becomes unstable when an absolute value of the difference between the wheel speeds of the left and right front wheels recognized by the front wheel speed difference recognizing apparatus is equal to or greater than a reference value.

10. A vehicle traction control system according to claim 1, wherein the vehicle is one of the four-wheel drive vehicle and a rear-wheel drive vehicle, the behavior judging unit includes a rear wheel speed difference recognizing apparatus that recognizes a difference between a wheel speed of a vehicle left rear driving wheel and a wheel speed of a vehicle right rear driving wheel, and the behavior judging unit judges that there is the possibility that behavior of the vehicle becomes unstable when an absolute value of the difference between the wheel speeds of the left and right rear wheels recognized by the rear wheel speed difference recognizing apparatus is equal to or greater than a reference value.

11. A vehicle traction control system according to claim 1, wherein the vehicle is a four-wheel drive vehicle, the behavior judging unit includes an average wheel speed difference recognizing apparatus that recognizes a difference between an average wheel speed of left and right front wheels and an average wheel speed of left and right rear wheels, and the behavior judging unit judges that there is the possibility that behavior of the vehicle becomes unstable when an absolute value of the difference between the average wheel speed of the left and right front wheels and the average wheel speed of the left and right rear wheels recognized by the average wheel speed difference recognizing apparatus is equal to or greater than a reference value.

12. A vehicle traction control system according to claim 1, wherein the cutting of fuel supply is finished when it is judged that the possibility that behavior of the vehicle becomes unstable has been eliminated.

13. A vehicle traction control system according to claim 12, wherein the behavior judging unit judges that there is no possibility that behavior of the vehicle becomes unstable.

14. A vehicle traction control system comprising:

driving slip judging means for judging a degree of driving slip of a driving wheel;

behavior judging means for judging if there is a possibility that behavior of a vehicle becomes unstable;

executing means for executing cutting of fuel supply to an engine so as to control the driving slip of the driving wheel when the degree of the driving slip judged by the driving slip judging means is equal to or greater than a reference value and it is judged by the behavior judging means that there is the possibility that behavior of the vehicle becomes unstable; and prohibiting means for prohibiting cutting of fuel supply to the engine for a predetermined time after execution of the cutting of fuel supply.

15. A method for controlling vehicle traction including:

a slip judging step for judging if a degree of driving slip of a driving wheel is equal to or greater than a reference value;

a first behavior judging step for judging if there is a possibility that behavior of a vehicle becomes unstable;

an executing step for executing cutting of fuel supply to an engine when the degree of the driving slip is judged at the slip judging step to be equal to or greater than the reference value and it is judged at the first behavior judging step that there is the possibility that behavior of the vehicle becomes unstable; and a prohibiting step for prohibiting cutting of fuel supply to the engine for a predetermined time after execution of the cutting of fuel supply.

16. A method for controlling vehicle traction according to claim 15, wherein the first behavior judging step judges that there is the possibility that behavior of the vehicle becomes unstable when the vehicle is in a turning state.

17. A method for controlling vehicle traction according to claim 15, wherein the first behavior judging step judges that there is the possibility that behavior of the vehicle becomes unstable when a difference between coefficients of friction of a road surface with respect to left and right wheels is equal to or greater than a reference value.

18. A method for controlling vehicle traction according to claim 15 further including a second behavior judging step for judging if there is the possibility that behavior of the vehicle becomes unstable after the executing step and a finishing step for finishing the cutting of fuel supply when it is judged at the second behavior judging step that there is no possibility that behavior of the vehicle becomes unstable.

19. A vehicle traction control system comprising:

a driving slip judging unit that judges a degree of driving slip of a driving wheel;

a behavior judging unit that judges if there is a possibility that behavior of a vehicle becomes unstable based on at least a condition other than the driving slip;

an executing unit that executes cutting of fuel supply to an engine so as to control the driving slip of the driving wheel when the degree of the driving slip is judged by the driving slip judging unit to be equal to or greater than a reference value and it is judged by the behavior judging unit that there is the possibility that behavior of the vehicle becomes unstable; and a prohibiting unit that prohibits cutting of fuel supply to the engine for a predetermined time after execution of the cutting of fuel supply.

20. A vehicle traction control system comprising:

a driving slip judging unit that judges a degree of driving slip of a driving wheel;

a behavior judging unit that judges if there is a possibility that behavior of a vehicle becomes unstable; and an executing unit that executes cutting of fuel supply to an engine so as to control the driving slip of the driving wheel when the degree of the driving slip judged by the driving slip judging unit is equal to or greater than a reference value and it is judged by the behavior judging unit that there is the possibility that behavior of the vehicle becomes unstable.

21. A vehicle traction control system according to claim 20 further comprising a prohibiting unit that prohibits cutting of fuel supply to the engine for a predetermined time after execution of the cutting of fuel supply, wherein the behavior judging unit judges if there is the possibility that behavior of the vehicle becomes unstable based on at least a condition other than the driving slip.

22. A vehicle traction control system comprising:

a driving slip judging unit that judges a degree of driving slip of a driving wheel;

a behavior judging unit that judges if there is a possibility that behavior of a vehicle becomes unstable based on at least a condition other than the driving slip; and an executing unit that executes cutting of fuel supply to an engine so as to control the driving slip of the driving wheel when the degree of the driving slip judged by the driving slip judging unit is equal to or greater than a reference value and it is judged by the behavior judging unit that there is the possibility that behavior of the vehicle becomes unstable.

23. A vehicle traction control system according to claim 22 further comprising a prohibiting unit that prohibits cutting of fuel supply to the engine for a predetermined time after execution of the cutting of fuel supply.

* * * * *